(12) United States Patent
Kavil Kambrath et al.

(10) Patent No.: US 11,401,918 B2
(45) Date of Patent: Aug. 2, 2022

(54) SYSTEM AND METHOD FOR CONTROLLING A WIND TURBINE

(71) Applicant: General Electric Renovables Espana, S.L., Barcelona (ES)

(72) Inventors: Jishnu Kavil Kambrath, Kannur (IN); Veena Padmarao, Bangalore (IN); Kapil Jha, Bangalore (IN); Nithya Anand, Bangalore (IN); Arvind Kumar Tiwari, Niskayuna, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/109,207

(22) Filed: Dec. 2, 2020

(65) Prior Publication Data
US 2022/0170443 A1    Jun. 2, 2022

(51) Int. Cl.
*F03D 7/00* (2006.01)
*F03D 7/02* (2006.01)
(Continued)

(52) U.S. Cl.
CPC .............. *F03D 7/0284* (2013.01); *F03D 9/11* (2016.05); *F03D 9/255* (2017.02);
(Continued)

(58) Field of Classification Search
CPC .......... F03D 7/0284; F03D 9/11; F03D 9/255; F05B 2220/706; F05B 2260/964;
(Continued)

(56) References Cited

U.S. PATENT DOCUMENTS 8,742,609 B2    6/2014  Helle et al.
8,946,916 B2 *  2/2015  Tarnowski ............ F03D 7/0276
                                                   290/44
(Continued)

FOREIGN PATENT DOCUMENTS

CN    106877360 A    6/2017
CN    107017647 A    8/2017
(Continued)

OTHER PUBLICATIONS

Khan et al., Control of Bidirectional DC/DC Converter for Back to Back NPC-Based Wind Turbine System Under Grid Faults, Conference 2016 4th International Conference on Development in the in Renewable Energy Technology (ICDRET), Dhaka, Bangladesh, Jan. 2016, 4 Pages. (ABSTRACT ONLY). https://www.researchgate.net/publication/299508789_Control_of_Bidirectional_DCDC_Converter_for_Back_to_Back_NPC-based_Wind_Turbine_System_under_Grid_Faults DOI: 10.1109/ICDRET.2016.7421483.
(Continued)

*Primary Examiner* — Julio C. Gonzalez
(74) *Attorney, Agent, or Firm* — Dority & Manning, P.A.

(57) ABSTRACT

A system and method are provided for controlling a wind turbine. Accordingly, a controller of the wind turbine detects an oscillation in the power output of the wind turbine during a recovery from a transient event. In response to detecting the oscillation, a portion of the power output during a peak phase of the oscillation is stored in an energy storage device. A portion of the stored power is then discharged during a valley phase of the oscillation in order to reduce an amplitude of the oscillation of the power output that is delivered to the power grid.

18 Claims, 9 Drawing Sheets

(51) Int. Cl.
  *F03D 9/25*   (2016.01)
  *F03D 9/11*   (2016.01)

(52) U.S. Cl.
  CPC ... *F05B 2220/706* (2013.01); *F05B 2260/964* (2013.01); *F05B 2270/107* (2013.01); *F05B 2270/327* (2013.01); *F05B 2270/335* (2013.01); *F05B 2270/337* (2013.01); *F05B 2270/342* (2020.08)

(58) Field of Classification Search
  CPC .......... F05B 2270/107; F05B 2270/327; F05B 2270/335; F05B 2270/337; F05B 2270/342
  See application file for complete search history.

(56) References Cited

U.S. PATENT DOCUMENTS

| | | | |
|---|---|---|---|
| 9,467,082 | B2 | 10/2016 | Garacia |
| 9,667,057 | B2 | 5/2017 | Roesner et al. |
| 10,113,533 | B2 | 10/2018 | Menke |
| 2009/0230689 | A1 | 9/2009 | Burra et al. |
| 2011/0074151 | A1 | 3/2011 | Burra et al. |
| 2011/0222320 | A1 | 9/2011 | Delmerico et al. |
| 2012/0104754 | A1 | 5/2012 | Rudolf et al. |
| 2013/0015658 | A1 | 1/2013 | Vath et al. |
| 2015/0145251 | A1 | 5/2015 | Wagoner et al. |
| 2015/0381089 | A1 * | 12/2015 | Tarnowski ................ H02J 3/38 307/84 |
| 2016/0285252 | A1 | 9/2016 | Burra et al. |

FOREIGN PATENT DOCUMENTS

| | | | |
|---|---|---|---|
| EP | 2481917 A1 | 8/2012 | |
| EP | 3779183 A1 * | 2/2021 | ........... F03D 7/0296 |
| WO | WO2016119585 A1 | 8/2016 | |

OTHER PUBLICATIONS

European Search Report for EP Application No. 21209789.3, dated Apr. 4, 2022.

\* cited by examiner

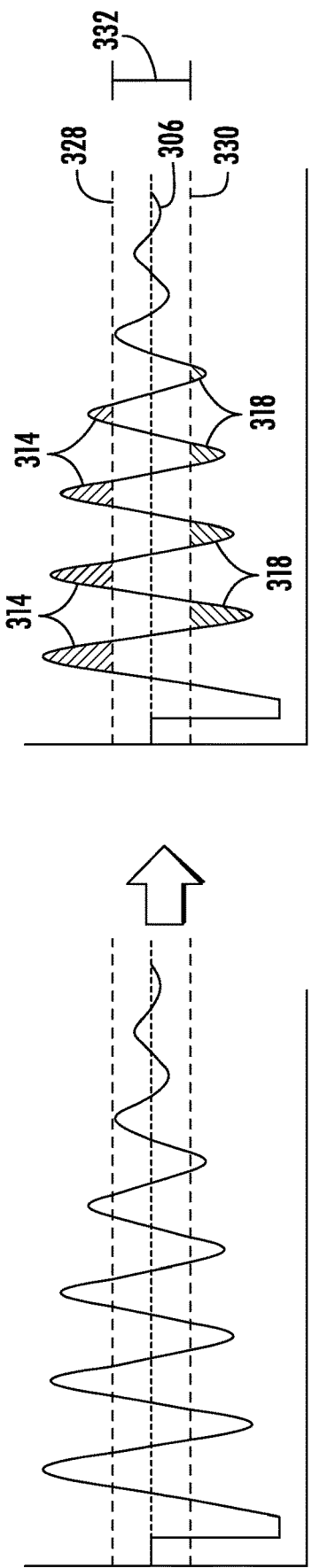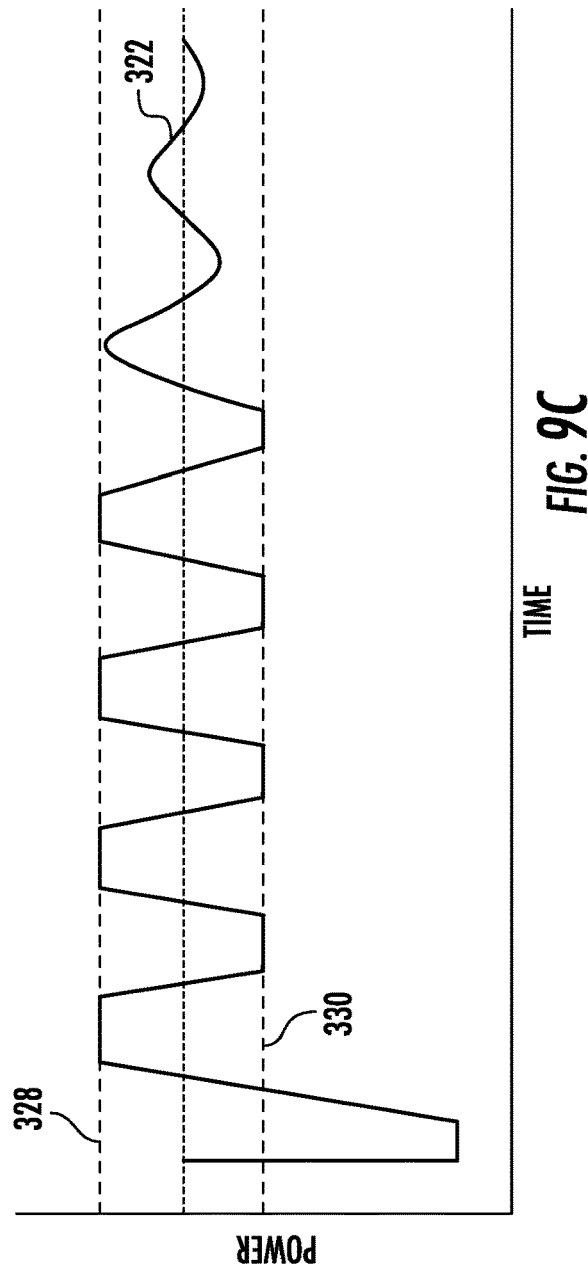

SYSTEM AND METHOD FOR CONTROLLING A WIND TURBINE

FIELD

The present disclosure relates in general to wind turbines, and more particularly to systems and methods for controlling wind turbines in response to a transient grid event.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to a power grid.

In order to supply power to the power grid, wind turbines generally need to conform to certain grid requirements. For example, wind turbines may be required to offer fault-ride through (e.g. low-voltage ride through) capability. This requirement may mandate that a wind turbine stay connected to the power grid during one or more transient grid events, such as a grid fault. As used herein, the terms "grid fault," "fault," or similar are intended to cover a change in the magnitude of a grid voltage for a certain time duration. For example, when a grid fault occurs, the voltage of the system can decrease by a significant portion for a short duration (e.g., typically less than 500 milliseconds). In addition, grid faults may occur for variety of reasons, including but not limited to a phase conductor being connected to a ground (i.e. a ground fault), short-circuiting between phase conductors, lightning and/or windstorms, and/or accidental transmission line grounding.

In the past, the wind turbine may have been immediately disconnected in response to the voltage reduction, but as the power production of the wind turbines has increased as a percentage of the power of the power grid, the desirability for the wind turbines to remain online and ride through the transient grid events has increased. However, the voltage reduction of the transient grid event may result in the torque of the generator being significantly reduced while the rotational speed of the rotor may remain essentially unchanged. As such, when the grid voltage returns to pre-fault levels, a mismatch between the torque of the generator and the inertia of the rotor may result in undesirable torsional vibrations in the drivetrain of the wind turbine. The torsional vibrations may manifest as oscillations in the power produced by the wind turbine which exceed certain power grid limits.

Thus, the art is continuously seeking new and improved systems and methods that address the aforementioned issues. As such, the present disclosure is directed to systems and methods for controlling a wind turbine to manage oscillations in the power output of the wind turbine in response to a transient grid event.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine connected to a power grid and including a generator. The method may include receiving, via a controller, an indication of a transient event occurring in the power grid. Additionally, the method may include detecting, via the controller, an oscillation in a power output of the wind turbine during a transient-event recovery phase following the transient event. The oscillation may include a peak phase followed by a valley phase, the peak phase in the valley phase being determined relative to the power output prior to the transient event. In response to detecting oscillation, the method may include storing at least a portion of the peak-phase power in an energy storage device operably to the generator to establish a storage charge. The peak-phase power may correspond to a power output during the peak phase. Additionally, the method may include discharging at least a portion of the storage charge to the power grid during the valley phase of the oscillation so as to reduce an amplitude of the oscillation of the power output delivered to the power grid.

In an embodiment, discharging at least the portion of the storage charge may also include determining, via the controller, a duration of the valley phase. The method may also include synchronizing a duration of the discharging of the portion of the storage charge to the duration of the valley phase.

In an additional embodiment, the method may also include determining, via the controller, a ramp rate and amplitude of the oscillation during the valley phase. Accordingly, the method may include synchronizing the discharging of the portion of the storage charge to the ramp rate and the amplitude of the oscillation during the valley phase.

In a further embodiment, the method may include determining an upper threshold and a lower threshold for a deviation of the power output of the wind turbine relative to the power output of the wind turbine prior to the transient event. The upper threshold and the lower threshold may define an oscillation tolerance band. The portion of the peak-phase power stored via the energy storage device may be a portion of the peak-phase power exceeding the upper threshold. Additionally, the method may include determining, via the controller, a portion of the valley-phase power which is below the lower threshold. The portion of the storage charge discharged may correspond to the portion of the valley-phase power below the lower threshold. The valley-phase power may correspond to a power output portion during the valley phase. The method may also include repeating the storing and discharging steps for subsequent oscillations until the deviation of the power output of the wind turbine remains within the oscillation tolerance band.

In yet a further embodiment, the thresholds may be a first upper threshold and a first lower threshold applied at a first interval following the transient event. Accordingly, the method may also include determining a second upper threshold and a second lower threshold for the power output of the wind turbine relative to the power output prior to the transient event. The second upper and the second lower thresholds may be applied at a second interval following the first interval and may have a lower deviation from the power output prior to the transient event than the first upper and the first lower thresholds.

In an embodiment, the method may include discharging a residual portion of the storage charge at a residual discharge rate to the power grid when the deviation of the power output of the wind turbine remains within the oscillation tolerance band.

In an additional embodiment, the method may include determining, via an oscillation-compensation control module of the controller, a magnitude of the portion of the peak-phase power stored by the energy storage device in response to the detection of the oscillation. Additionally, the method may include determining, via the oscillation-competition control module, a magnitude of the portion of the storage charge discharged upon the detection of the valley phase. Further, the method may include generating, via the oscillation-competition control module, a setpoint command for a line-side converter of a power converter of the wind turbine so as to achieve the determined storage charge and discharge.

In a further embodiment, the method may include receiving, via the oscillation-compensation control module, a plurality of operating parameters. The oscillation-compensation control module may also receive a damping torque command from a drivetrain damping system of the wind turbine. The method may also include determining, via the oscillation-compensation control module, a plurality of oscillation parameters for the power output of the wind turbine based on one or more of the operating parameters and the damping torque command. Additionally, the method may include filtering, via the oscillation-competition control module, a plurality of oscillation parameters to obtain a plurality of oscillatory power components. The plurality of oscillatory components may include a stator oscillatory power, a rotor oscillatory power and/or a line-side oscillatory power. The method may also include determining, via the oscillation-compensation control model, a magnitude of the portion of the peak-phase power stored by the energy storage device based, at least in part, on at least one of the plurality of oscillatory power components.

In yet a further embodiment, the method may include determining, via the control module, a magnitude of the transient event based on the plurality of operating parameters. The method may also include initiating, via the control module, a first and/or a second operating mode based on the magnitude of the transient event. The first operating mode may include storing and discharging the rotor oscillatory power. The second operating mode may include storing and discharging both the rotor oscillatory power and the stator oscillatory power.

In an embodiment, the plurality of operating parameters may be indicative of a magnitude of slip, a generator speed, and a plurality of voltages and currents. The plurality of voltages and currents may include a stator voltage and current, a rotor voltage and current, and a line-side voltage and current at each of three phases of power. Determining the plurality of oscillation parameters for the power output of the wind turbine may be based on the magnitude of slip, the generator speed, and the damping torque command.

In an additional embodiment, the energy storage device may be a battery and/or a super capacitor.

In a further embodiment, receiving the indication of the transient event occurring in the power grid may include receiving, via the controller, data indicative of the changing event from a sensor operably coupled between a line side of a power converter of the wind turbine and a point of interconnect with the power grid.

In yet a further embodiment, the transient event may be a zero-voltage ride through event, a low-voltage right through event, and/or a high-voltage ride through event.

In another aspect, the present disclosure is directed to a system for controlling a wind turbine connected to a power grid. The system may include a generator operably coupled to an energy storage device and a controller communicatively coupled to the generator. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9A illustrates a graphical representation of one embodiment of a power output of the wind turbine following a transient grid event according to the present disclosure;

FIG. 9B illustrates a graphical representation of one embodiment of a power output of the wind turbine, particularly illustrating portions of the peak-phase power and portions of the storage charge according to the present disclosure; and FIG. 9C illustrates a graphical representation one embodiment of the power output of the wind turbine as delivered to the power grid according to the present disclosure.

Figure 1:
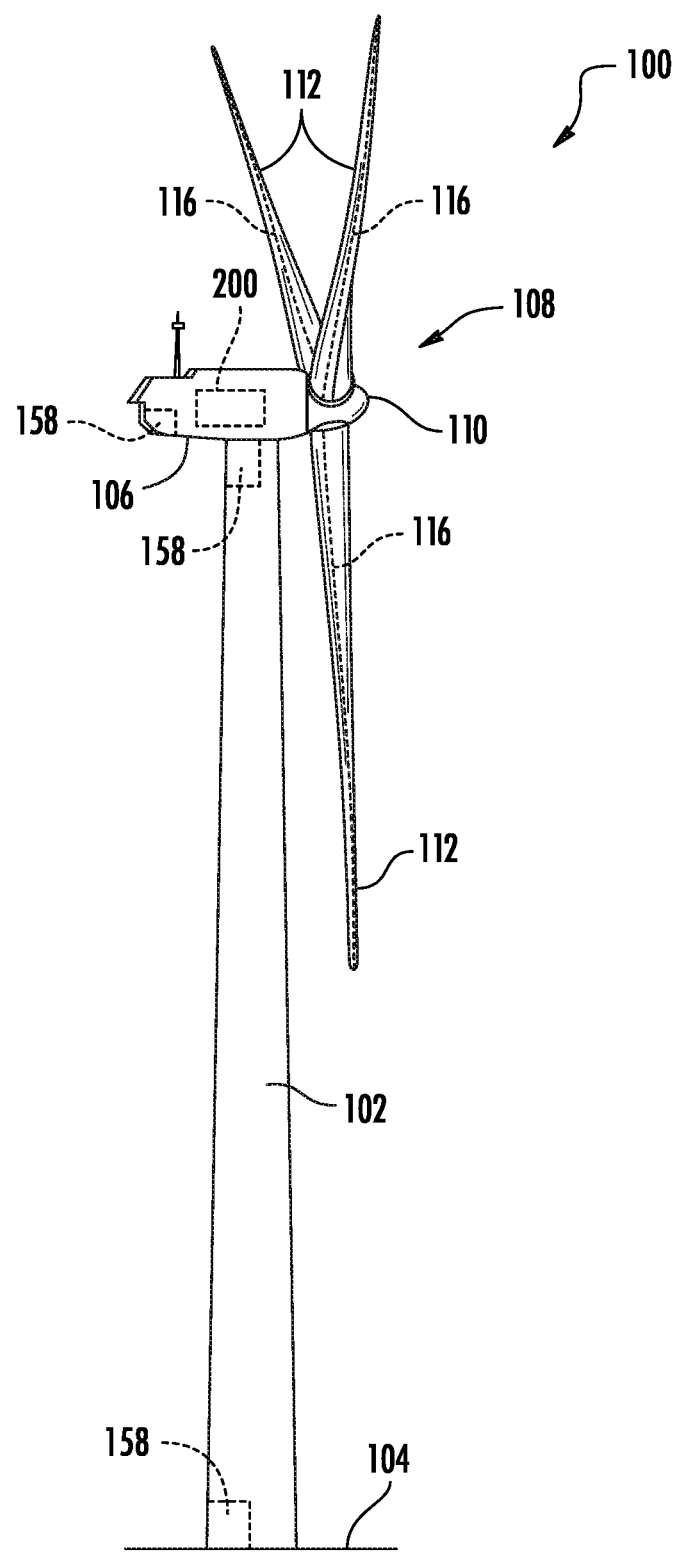
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine so as to reduce oscillations in the electrical power delivered to the power grid by the wind turbine following a transient grid event. Typically, wind turbines counter the torque generated by the rotor in response to the wind with a torque generated by the generator. Many modern wind turbines employ generators, such as a doubly-fed induction generator (DFIG), which utilize grid power for the generation of the generator torque. At the outset of a transient grid event, such as a low-voltage ride through (LVRT) event, the grid power may suddenly decrease resulting in a corresponding decrease in the generator torque. However, due to inertia and/or the effects of the wind, the rotor may continue rotating at the same speed and may, in some instances, accelerate when the rotation is not significantly resisted by the generator torque. When a transient grid event concludes, and the grid power returns, the generator may rapidly resume developing generator torque in order to return the wind turbine to a power producing state. However, within the drivetrain of the wind turbine, the generator torque may encounter the torque resulting from the rotation of the rotor. This encounter may develop a torsional vibration within the drivetrain. A drivetrain-damper (DTD) control system may be employed to rapidly damp the resultant torsional vibration. However, until such time as the torsional vibration is damped, the torsional vibration may result in oscillations in the power output of the wind turbine which is delivered to the power grid. Accordingly, the systems and methods of the present disclosure may be employed to shape the power output of the wind turbine until such time as torsional vibration is damped and stable power production is reestablished following the transient event.

In particular the present disclosure includes systems and methods which may detect oscillations in the power output of the wind turbine during a transient-event recovery phase following a transient event. The oscillations in the power output may be characterized by at least one peak phase (e.g. a crest phase) during which the power output of the wind turbine may be greater than the power output of the wind turbine prior to the transient event. Each peak phase may be followed by a valley phase (e.g. a trough phase) during which the power output of the wind turbine may dip below the power output of the wind turbine prior to the transient event.

As the oscillations in the power output may exceed certain grid requirements relating to stability of power delivered to the grid, the controller may store at least a portion of the peak-phase power in an energy storage device. At least a portion of the stored power may then the discharged to the power grid during the valley phase. In other words, a portion of the power generated during the peak phase which exceeds a threshold may be diverted to an energy storage device rather than being delivered to the power grid. Similarly, once the power output dips below a minimum threshold, the extra power stored from the peak phase may be discharged to the grid in order to make up the difference between the minimum threshold and the actual power production during the valley phase. As a result, the power output, as seen by the power grid, may not exceed an upper deviation threshold and may remain above a minimum deviation threshold. Thus, even though torsional vibration may be present during the transient event recovery phase, the power oscillations due to torsional vibration may not be delivered to the power grid. In effect, by selectively diverting and then discharging a portion of the power output of the generator, the effects of the torsional vibration on the power output of the wind turbine may be essentially concealed from the power grid. This, in turn, may improve the ability of the wind turbine to satisfy grid code requirements related to power oscillations following a grid event, such as requirements that govern rise time, overshoot/undershoot, settling time, and/or a damping oscillatory response.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 400 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
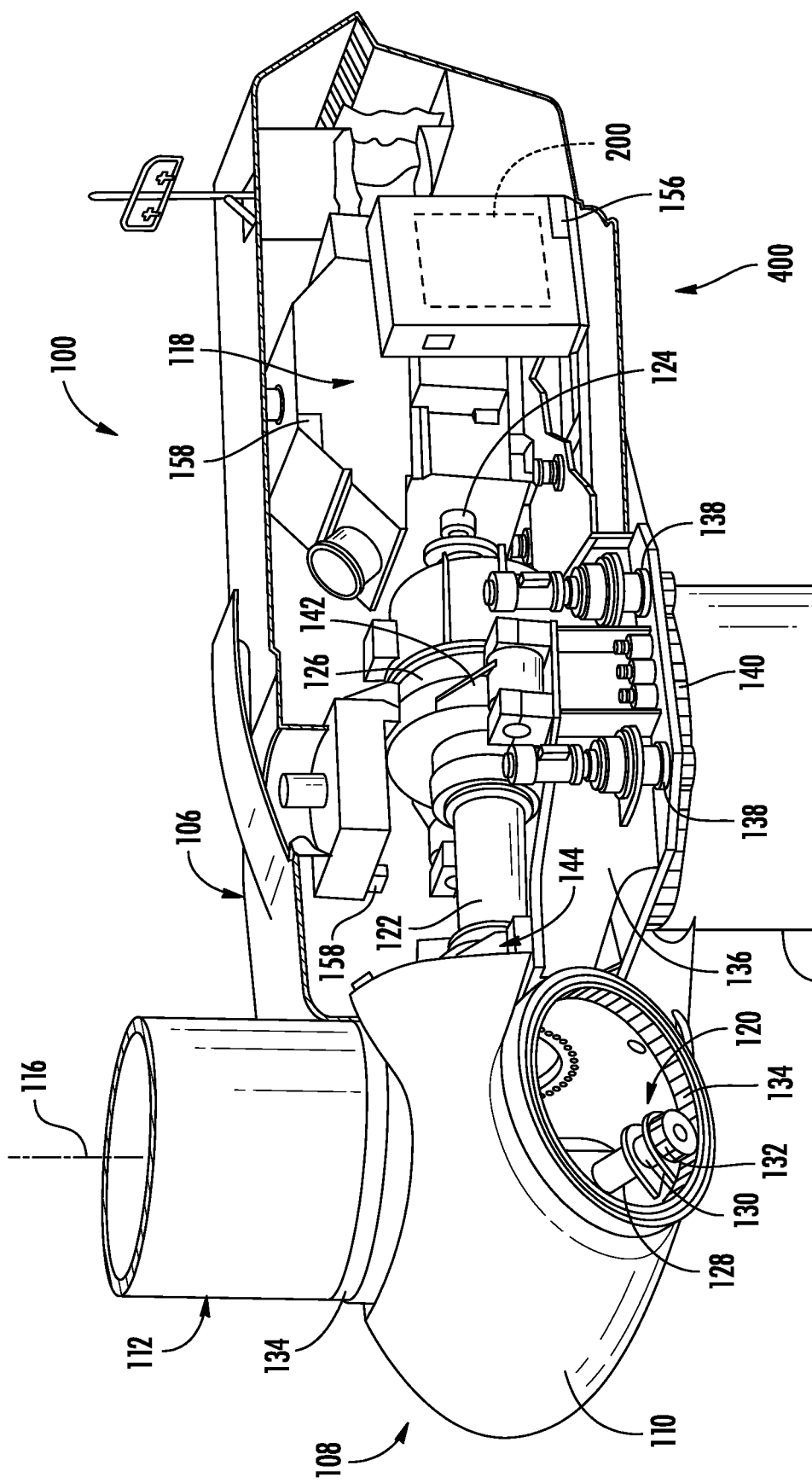
FIG. 2 illustrates a perspective, internal view of one embodiment of a nacelle of the wind turbine according to the present disclosure.
Figure 3:
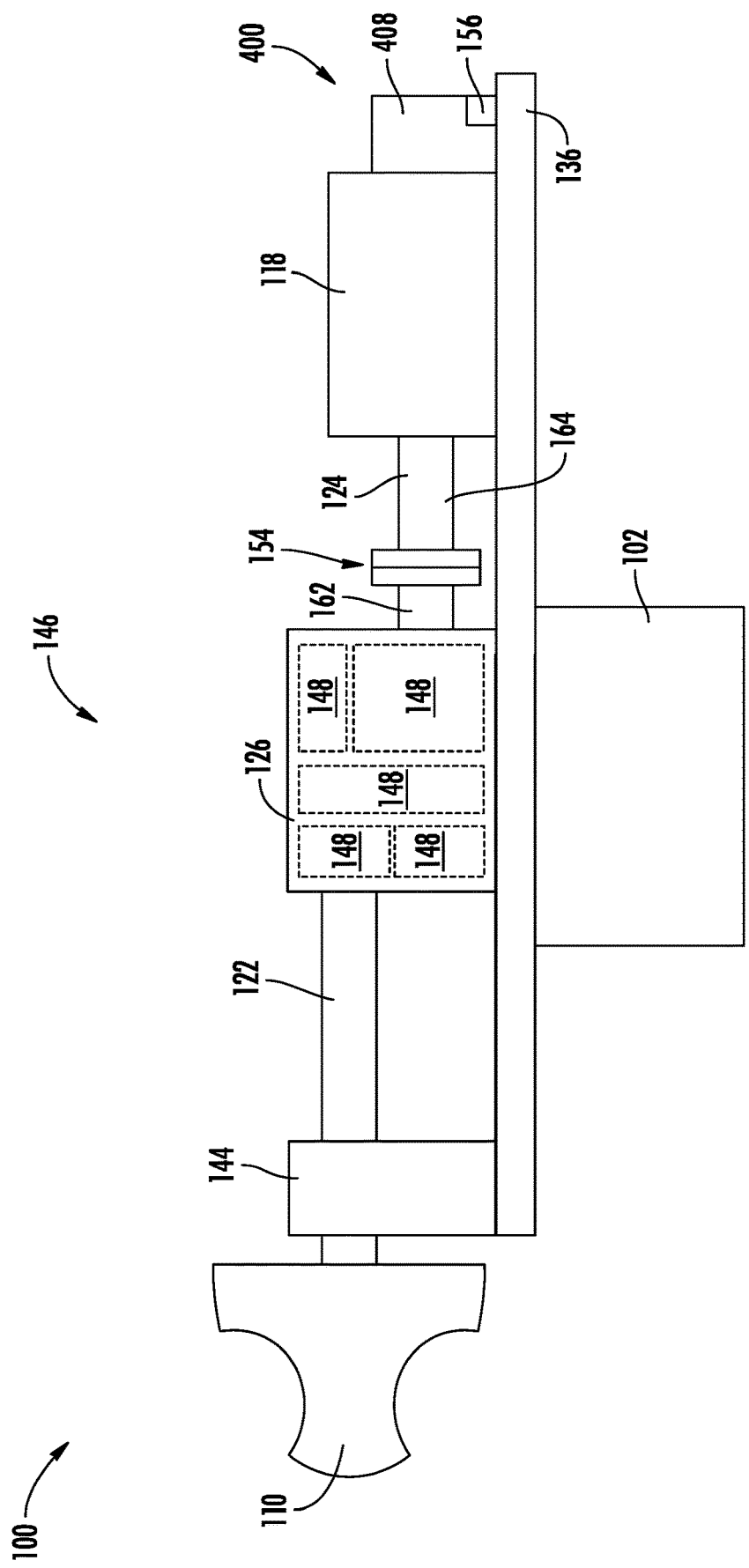
FIG. 3 illustrates a schematic diagram of one embodiment of a drivetrain of the wind turbine according to the present disclosure.
Figure 4:
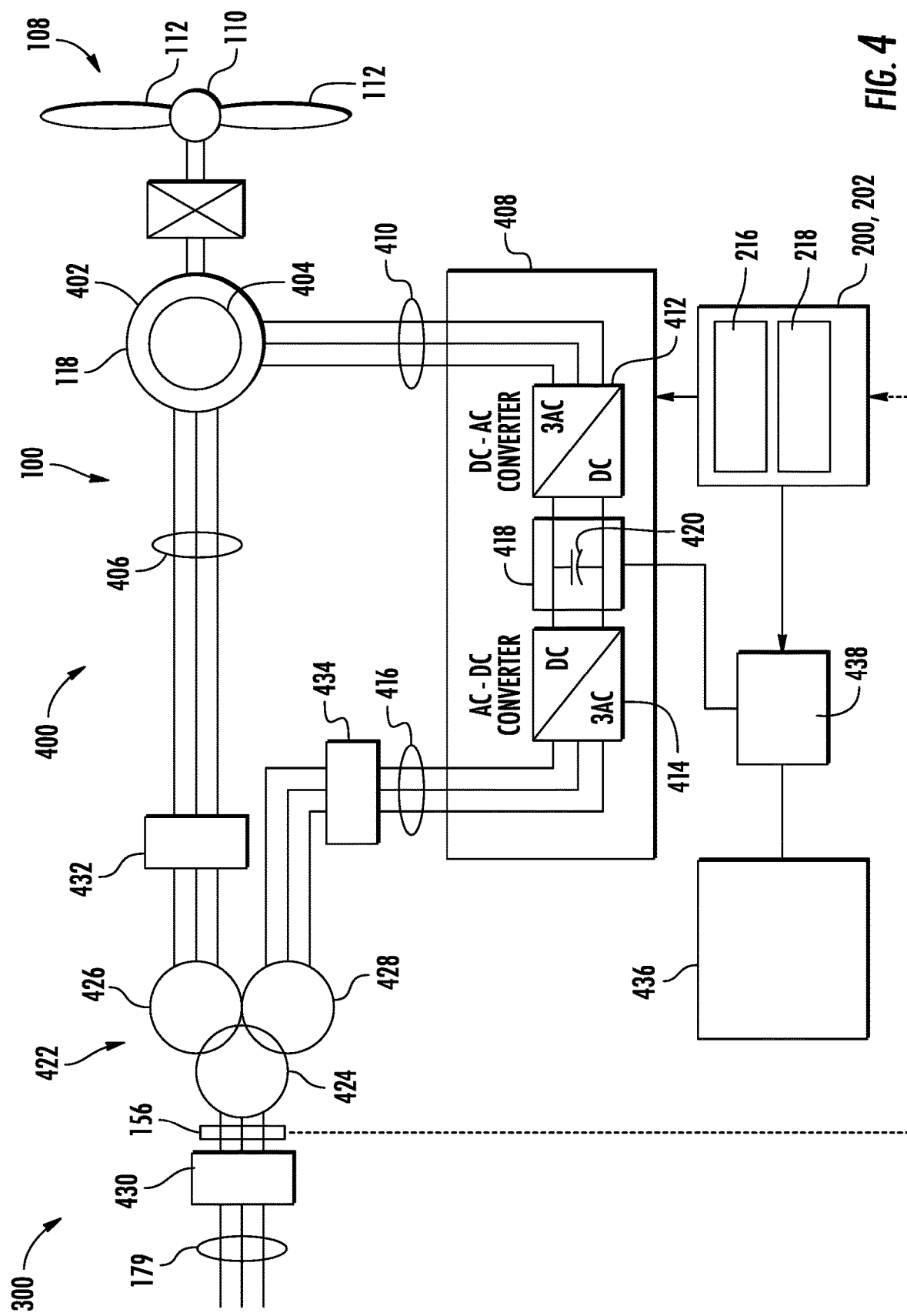
FIG. 4 illustrates a schematic diagram of one embodiment of an electrical system for use with the wind turbine according to the present disclosure.
Figure 5:
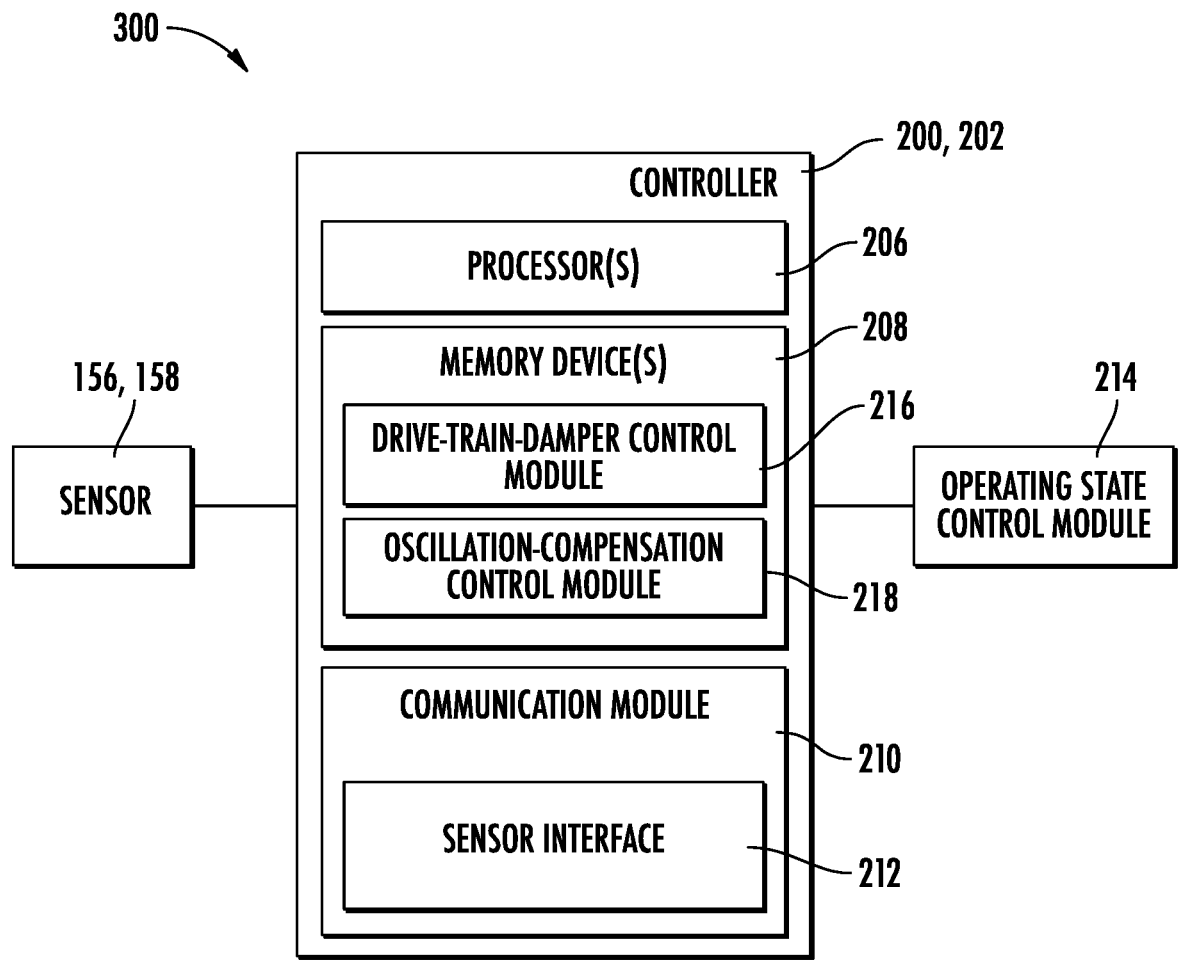
FIG. 5 illustrates a block diagram of one embodiment of a controller for use with the wind turbine according to the present disclosure.

Referring now to FIGS. 2-4, a simplified, internal view of one embodiment of the nacelle 106, a schematic diagram of one embodiment of a drivetrain 146, and an exemplary electrical system 400 of the wind turbine 100 shown in FIG. 1 are illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears 148 to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

In an embodiment, the rotor 108 may be slowed via a torque generated by the generator 118. As the generator 118 may generate a torque counter to the rotation of the rotor 108, the high-speed shaft 124 may be equipped with a slip coupling 154. The slip coupling 154 may prevent damage to a component of the drivetrain 146 due to overloading of the drivetrain 146. As such, the slip coupling 154 may have a release threshold, or traction, above which the slip coupling 154 may permit first and second portions 162, 164 of the high-speed shaft 124 to have a different rotational speeds. It should be appreciated that, if the torsional moment at the slip coupling 154 exceeds the release/traction threshold, the generator 118 may be communicatively decoupled from the rotor 108. In such an event, the torque developed by the generator 118 may be unavailable to slow the rotor 108 or an increased rotational speed of the rotor 108 may be unavailable for increased power production.

Each rotor blade 112 may also include a pitch control mechanism 120 configured to rotate the rotor blade 112 about its pitch axis 116. Each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Referring particularly to FIG. 2, in an embodiment, the wind turbine 100 may include at least one operational sensor 158. The operational sensor(s) 158 may be configured to detect a performance of the wind turbine 100, e.g. in response to the environmental condition. For example, the operational sensor(s) 158 may be a rotational speed sensor operably coupled to the controller 200. The operational sensor(s) 158 may be directed at the rotor shaft 122 of the wind turbine 100 and/or the generator 118. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a D.C. tachometer, an A.C. tachometer, a digital tachometer, a contact tachometer a non-contact tachometer, or a time and frequency tachometer. In an embodiment, the operational sensor(s) 158 may, for example, be an encoder, such as an optical encoder. Additionally, the operational sensor(s) 158 may be configured to monitor a plurality of electrical conditions, such as slip, stator voltage and current, rotor voltage and current, and line-side voltage and current at each of three phases of power. Accordingly, in an embodiment, the operational sensor(s) 158 may be configured to monitor operating parameters 301 (FIG. 6) of wind turbine 100.

Further, in an embodiment, the wind turbine 100 may include, or be operably coupled to, at least one grid sensor 156 configured to monitor at least one parameter of the power of the power grid 179 and/or an power output of the wind turbine 100 delivered to the power grid 179. For example, the grid sensor(s) 156 may be configured to continuously monitor the voltage of the power grid 179 as seen by the wind turbine 100 and vice versa. Accordingly, the grid sensor(s) 156 may, in an embodiment, be an ammeter, a voltmeter, an ohmmeter, and/or any other suitable sensor for monitoring the power of the power grid 179 and/or the power output of the wind turbine 100.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

Referring particularly to FIG. 4, in an embodiment, the electrical system 400 may include various components for converting the kinetic energy of the rotor 108 into an electrical output in an acceptable form to a connected power grid 179. For example, in an embodiment, the generator 118 may be a doubly-fed induction generator (DFIG) having a stator 402 and a generator rotor 404. The generator 118 may be coupled to a stator bus 406 and a power converter 408 via a rotor bus 410. In such a configuration, the stator bus 406 may provide an output multiphase power (e.g. three-phase power) from a stator of the generator 118, and the rotor bus 410 may provide an output multiphase power (e.g. three-phase power) of the generator rotor 404 of the generator 118. Additionally, the generator 118 may be coupled via the rotor bus 410 to a rotor side converter 412. The rotor side converter 412 may be coupled to a line-side converter 414 which, in turn, may be coupled to a line-side bus 416.

In an embodiment, the rotor side converter 412 and the line-side converter 414 may be configured for normal operating mode in a three-phase, pulse width modulation (PWM) arrangement using insulated gate bipolar transistors (IGBTs) as switching devices. Other suitable switching devices may be used, such as insulated gate commuted thyristors, MOS-FETs, bipolar transistors, silicone controlled rectifier's, and/or other suitable switching devices. The rotor side converter 412 and the line-side converter 414 may be coupled via a DC link 418 across a DC link capacitor 420.

In an embodiment, the power converter 408 may be coupled to the controller 200 configured as a converter controller 202 to control the operation of the power converter 408. For example, the converter controller 202 may send control commands to the rotor side converter 412 and the line-side converter 414 to control the modulation of switching elements used in the power converter 408 to establish a desired generator torque setpoint and/or power output.

As further depicted in FIG. 4, the electrical system 400 may, in an embodiment, include a transformer 422 coupling the wind turbine 100 to the power grid 179. The transformer 422 may, in an embodiment, be a 3-winding transformer which includes a high voltage (e.g. greater than 12 KVAC) primary winding 424. The high voltage primary winding 424 may be coupled to the power grid 179. The transformer 422 may also include a medium voltage (e.g. 6 KVAC) secondary winding 426 coupled to the stator bus 406 and a low voltage (e.g. 575 VAC, 690 VAC, etc.) auxiliary winding 428 coupled to the line bus 416. It should be appreciated that the transformer 422 can be a three-winding transformer as depicted, or alternatively, may be a two-winding transformer having only a primary winding 424 and a secondary winding 426; may be a four-winding transformer having a primary winding 424, a secondary winding 426, and auxiliary winding 428, and an additional auxiliary winding; or may have any other suitable number of windings.

In an embodiment, the electrical system 400 may also include various circuit breakers, fuses, contactors, and other devices to control and/or protect the various components of the electrical system 400. For example, the electrical system 400 may, in an embodiment, include a grid circuit breaker 430, a stator bus circuit breaker 432, and/or a line bus circuit breaker 434. The circuit breaker(s) 430, 432, 434 of the electrical system 400 may connect or disconnect corresponding components of the electrical system 400 when a condition of the electrical system 400 approaches an operational threshold of the electrical system 400.

In accordance with the present disclosure, in an embodiment, the electrical system 400 may include an energy storage device 436 operably coupled to the generator 118. The energy storage device 436 may, in an embodiment, be a battery and/or a super capacitor configured to receive a charge from the generator 118 and discharge the charge to the power grid 179. Accordingly, the energy storage device 436 may be coupled to the power converter 408 via a bidirectional converter 438. For example, the bidirectional converter 438 may, in an embodiment, be operably coupled to the DC link 418. In an embodiment, the energy storage device 436 may be communicatively coupled to the controller 200 via the bidirectional converter 438 such that the controller 200 may direct the operation of the energy storage device 436 as disclosed herein. It should be appreciated that the energy storage device 436 may be a pre-existing component operably coupled to the wind turbine 100, such as in an embodiment wherein the wind turbine 100 is a power generating asset of a hybrid power generating facility.

Referring still to FIG. 4, and also to FIGS. 5-9, multiple embodiments of a system 300 for controlling the wind turbine 100 according to the present disclosure are presented. As shown particularly in FIG. 5, a schematic diagram of one embodiment of suitable components that may be included within the system 300 is illustrated. For example, as shown, the system 300 may include the controller 200 communicatively coupled to the operational sensor(s) 158 and the grid sensor(s) 156. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 158, 156 to be converted into signals that can be understood and processed by the processors 206. It should be appreciated that the sensor(s) 158, 156 may be communicatively coupled to the communications module 210 using any suitable means. For example, the sensor(s) 158, 156 may be coupled to the sensor interface 212 via a wired connection. However, in other embodiments, the sensor(s) 158, 156 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, storing at least a portion of the peak-phase power of produced by the generator 118 in response to a transient event during a peak phase of an oscillation and discharging at least a portion of the stored charge during a valley phase of the oscillation as described herein, as well as various other suitable computer-implemented functions.

Referring particularly to FIG. 6-9, in an embodiment, the controller 200 of the system 300 may receive an indication of a transient event 302 occurring in the power grid 179. The transient grid event 302 may lead to the development of a torsional vibration within the drivetrain 146 of the wind turbine 100. As such, the controller 200 may be configured to detect an oscillation 304 in the power output 306 of the wind turbine 100 during a transient-grid-event recovery phase ($R_{GE}$) following the transient event 302. The oscillation 304 may include at least one peak phase 308 followed by a valley phase 310. The peak phase(s) 308 may be considered to be a portion of the power output 306 which is greater than the power output prior to the transient event 302 (e.g., pre-transient grid event ($P_{GE}$) voltage 312), while the valley phase(s) 310 may be considered to be a portion of the power output 306 which is less than the power output prior to the transient event 302. In response to detecting the oscillation 304, the controller 200 may store at least a portion of the peak-phase power 314 (e.g., a portion of the power output 306 of the generator 118 developed during the peak phase(s) 308) in the energy storage device 436 operably coupled to the generator 118. Storing a portion of the peak-phase power 314 in the energy storage device 436 may establish a storage charge 316 in the energy storage device 436. The system 300 may discharge at least a portion 318 of the storage charge 316 to the power grid 179 during the valley phase(s) 310 of the oscillation 304. Discharging the portion 318 of the storage charge 316 may reduce an amplitude 320 of the oscillation 304 of the power output 306 delivered to the power grid 179 (e.g. delivered power 322).

In an embodiment, the transient grid event 302 may be a zero-voltage ride through (ZVRT) event, a low-voltage ride through (LVRT) event and/or a high-voltage ride through (HVRT) event wherein a rapid change in the voltage of the power grid 179, or the effects thereof, is detected, such as by the grid sensor(s) 156. For example, in an embodiment, the LVRT event may be characterized by a voltage decrease which is at least 50% of the pre-transient grid event ($P_{GE}$) voltage. In an additional embodiment, the voltage decrease may be less than or equal to 70% of the pre-transient grid event ($P_{GE}$) voltage. It should be appreciated that, in an embodiment, maintaining at least 30% of the pre-transient grid event ($P_{GE}$) voltage 312 throughout the transient grid event 302 may facilitate the recovery of the wind turbine 100 from the transient grid event 302 in that the maintained voltage may provide an initial resistive force against which generator torque may be developed and increased.

In an embodiment, the transient event 302 may be detected by the controller 200 based on data received from a sensor (e.g., the grid sensor 156) which is indicative of the transient event 302. In such an embodiment, the grid sensor 156 may be operably coupled between a line-side of the power converter 408 and a point of interconnect with the power grid 179. For example, the data received by the controller 200 may indicate a rapid change in the voltage of the power grid 179.

In an embodiment, the transient event 302 may be detected by the controller 200 based on a change in the drivetrain torque 303 of the wind turbine 100. For example, in an embodiment, the controller 200 may receive data indicative of a plurality of operating parameters 301 from the operational sensor(s) 158. The plurality of operating parameters 301 may, in an embodiment, correspond to operating parameters of the rotor 108 and/or the generator 118. For example, the plurality of operating parameters 301 may be indicative of rotor speed, rotor angular displacement, rotor angular acceleration, generator speed, generator angular displacement, and/or generator angular acceleration. Accordingly, the controller 200 may utilize the plurality of operating parameters 301 to determine a change in the drivetrain torque 303 which may be indicative of the transient event 302.

In response to the transient grid event 302, the controller 200 may, in an embodiment, generate a damping torque command 324 via a drive-train-damper control module 216. The damping torque command 324 may establish a default damping level 326 of the torsional vibration resulting from the transient grid event 302. The damping torque command 324 may be calculated to increase a natural damping of the drivetrain 146 thereby reducing the magnitude, frequency, and/or duration of the torsional vibration. It should, however, be appreciated that the oscillations 304 in the power output 306 may continue until the torsional vibration is reduced to a pre-transient grid event ($P_{GE}$) vibration level.

In order to reduce the amplitude 320 of the oscillations 304 of the delivered power 322, the controller 200 may, in an embodiment, determine an upper threshold 328 for a deviation of the power output 306 of the wind turbine 100 relative to the power output/power level of the wind turbine 100 prior to the transient event 302. In an embodiment, the controller 200 may also determine a lower threshold 330 for the deviation of the power output 306 relative to the power output prior to the transient event 302. The upper threshold 328 and the lower threshold 330 may define an oscillation tolerance band 332.

As depicted at 329, in an embodiment, the controller 200 may determine the portion of the peak-phase power 314 exceeding the upper threshold 328. In an embodiment, the portion of the peak-phase power 314 stored via the energy storage device 436 may be the portion of the peak-phase power 314 exceeding the upper threshold 328, as particularly depicted in FIGS. 8 and 9. In other words, the amount of the power generated by the generator 118 during the peak phase(s) 308 which would exceed a grid limit (e.g., the upper threshold 328) if delivered to the grid may be diverted to the energy storage device 436 while the remainder of the power generated during the peak phase(s) 308 is delivered to the grid 179.

As depicted at 331, in an embodiment, the controller 200 may determine a portion of the valley-phase power 334 which is below the lower threshold 330. In an embodiment, the portion 318 of the storage charge 316 discharged may correspond to the portion of the valley-phase power 334 below the lower threshold 330. In such an embodiment, the valley-phase power 334 may correspond to a portion of the power output 306 generated during the valley phase(s) 310 of the oscillation 304. In other words, by discharging the portion 318 of the storage charge 316 when the power generated by the generator 118 is below a minimum requirement (e.g. the lower threshold 330), the system 300, may preclude the power grid 179 from detecting (e.g. seeing) the unacceptable drop in the power output 306.

In an embodiment, the upper and lower threshold 328, 330 may be a first upper threshold and a first lower threshold applied at a first interval 336 following the transient event 302. In such an embodiment, the system 300 may determine a second upper threshold 338 and a second lower threshold 340 for the power output 306 relative to the power output of the wind turbine 100 prior to the transient event 302. The second upper and second lower thresholds 338, 340 may, in an embodiment, be applied at a second interval 342 following the first interval 336. The second upper and second lower thresholds 338, 340 may have a lower deviation from the power output prior to the transient event 302 than the first upper and the first lower thresholds 328, 330. It should be appreciated that the second upper and second lower thresholds 338, 340 may facilitate compliance with a power grid 179 requirement necessitating an increasingly stable power output 306 as an elapsed time from the transient event 302 increases.

It should further be appreciated that the utilization of the first set of thresholds 328, 330 and the second set of thresholds 338, 340 may facilitate a more tailored control scheme then may be available utilizing only a single set of thresholds. For example, if the more restrictive second upper and second lower thresholds 330, 340 were implemented at the initiation of the transient-grid-event recovery phase ($R_{GE}$) in an embodiment, the magnitude of the portion of the peak-phase power 314 to be diverted to the energy storage device 436 may exceed a capacity of a component of the wind turbine 100.

As depicted at 344, the controller 200 may be configured to determine whether the magnitude of the amplitude 320 of the oscillation 304 (e.g. the deviation of the power output 306 from the pre-transient grid event ($P_{GE}$) voltage 312) is within the oscillation tolerance band 332. In an embodiment wherein the oscillation 304 exceeds the oscillation tolerance band 332, the controller 200 may repeat the storing and discharging steps of the system 300 for subsequent oscillations until the deviation of the power output 306 remains within the oscillation tolerance band 332. However, in an embodiment wherein the deviation of the power output 306 of the wind turbine 100 remains within the oscillation tolerance band 332, the controller may discharge a residual portion 346 of the storage charge 316 to the power grid 179.

An exemplary operation of an embodiment of the system 300 is depicted in FIG. 9. As depicted, FIG. 9A represents the oscillations 304 of the power output 306 in an embodiment wherein the controls of system 300 are not omitted. As such FIG. 9A may represent the natural power output 306 of the wind turbine 100 in response to the transient event 302. In contrast, FIG. 9B depicts the portions of the peak-phase power 314, which may be stored via the energy storage device 436 during the peak phases 308 and the corresponding portions 318 of the storage charge 316, which may be discharged during the respective valley phases 310. As depicted in FIG. 9B, in an embodiment, the storing and discharging steps of the system 300 may be repeated for subsequent oscillations until the deviation of the power output 306 of the wind turbine 100 remains within the oscillation tolerance band 332. FIG. 9C may represent the effects of the system 300 on the delivered power 322 in an embodiment. As depicted in FIG. 9C, in an embodiment, any portion of the peak-phase power 314 which may exceed the upper threshold 328 may not be delivered to the power grid 179, while the power output 306 may be augmented by the storage charge 316 so that the delivered power 322 remains above the lower threshold 330. As a result, the delivered power 322 may be in compliance with a grid requirement governing deviations in the power output 306 of the wind turbine 100. It should be appreciated that the waveform depicted in FIG. 9C is not intended to limit the delivered power 322 to a particular waveform. On the contrary, FIG. 9C indicates that the delivered power 322, as seen by the power grid 179, may remain between the upper and lower thresholds 328, 330. For example, in an embodiment, the delivered power 322, as seen by the power grid 179, may have a sinusoidal or other suitable waveform having a reduced amplitude 320.

Referring again particularly to FIG. 6, in an embodiment, discharging the portion 318 of the storage charge 316 may include determining a duration 348 of the valley phase(s) 310. Based on this determination, the controller 200 may synchronize the discharge duration 350 of the portion of 318 of the storage charge 316 to the duration 348 of the valley phase(s) 310. It should be appreciated that synchronizing the discharge duration 350 with the duration 348 of the valley phase(s) 310 may limit the augmentation of the output power 306 to periods wherein the power output 306 is below the pre-transient grid event ($P_{GE}$) voltage 312, and therefore to periods wherein the augmentation may be beneficial.

In an embodiment, the controller 200 may determine a ramp rate 352 and the amplitude 320 of the oscillation 304 during the valley phase(s) 310. As depicted at 354, in an embodiment, the controller 200 may synchronize the discharging of the portion 318 of the storage charge 316 to the ramp rate 352 and the amplitude 320 of the oscillation 304 during the valley phase(s) 310. For example, in an embodiment, the discharge of the portion 318 of the storage charge 316 may be shaped to conform with the shape of the oscillation 304 during the valley phase(s) 310. In other words, synchronizing the discharge in the manner described may facilitate providing only so much power as may be necessary to augment the power output 306 at each instant of the valley phase(s) 310. It should further be appreciated that discharging the portion 318 of the storage charge 316 without synchronizing the discharge to the oscillation 304 may result in discharging an excess or an inadequate portion of the storage charge 316 relative to an amount of additional power required to augment the power output 306 in order to satisfy a requirement of the power grid 179.

Figure 6:
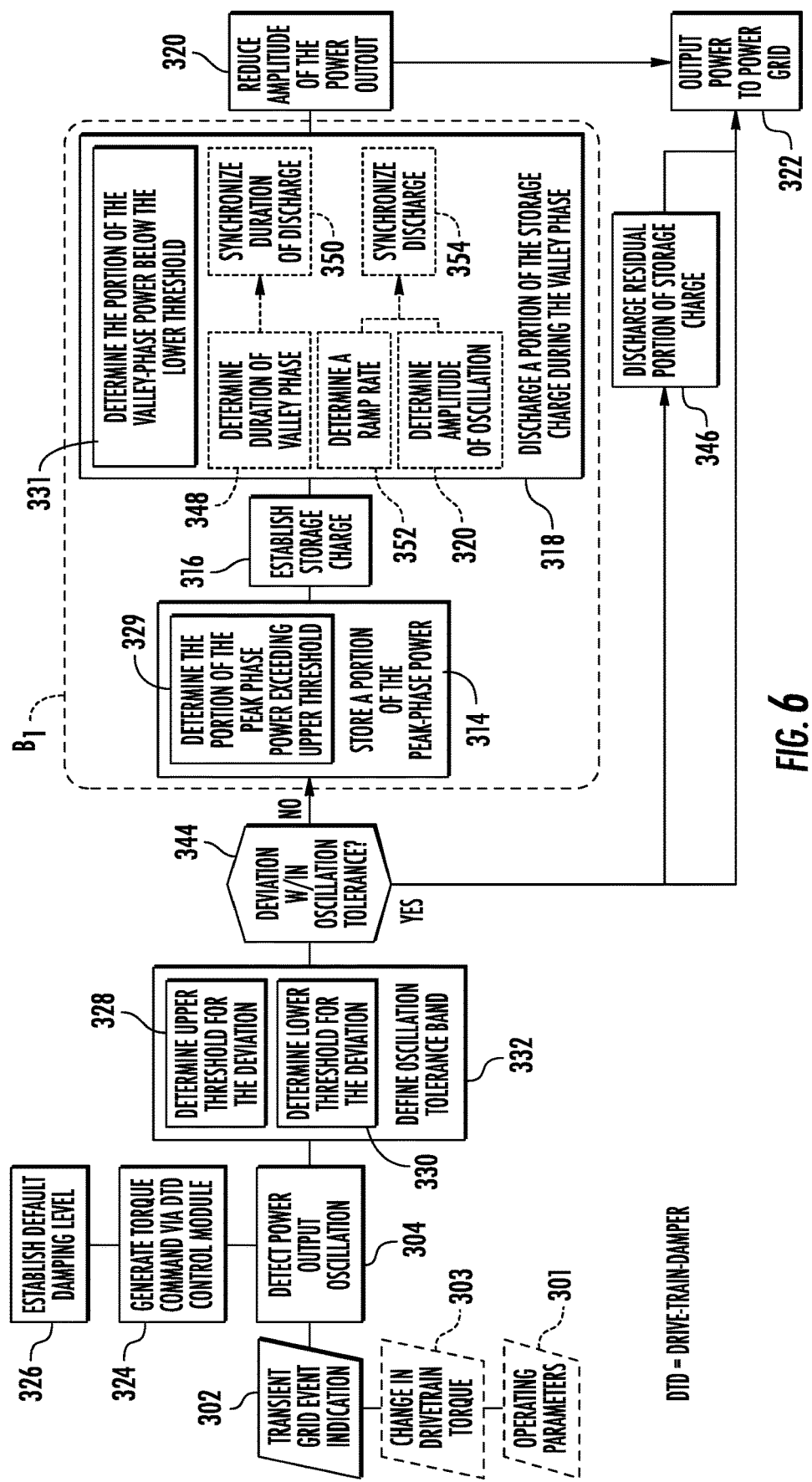
FIG. 6 illustrates a flow diagram of one embodiment of a control logic of a system for controlling a wind turbine according to the present disclosure.
Figure 7:
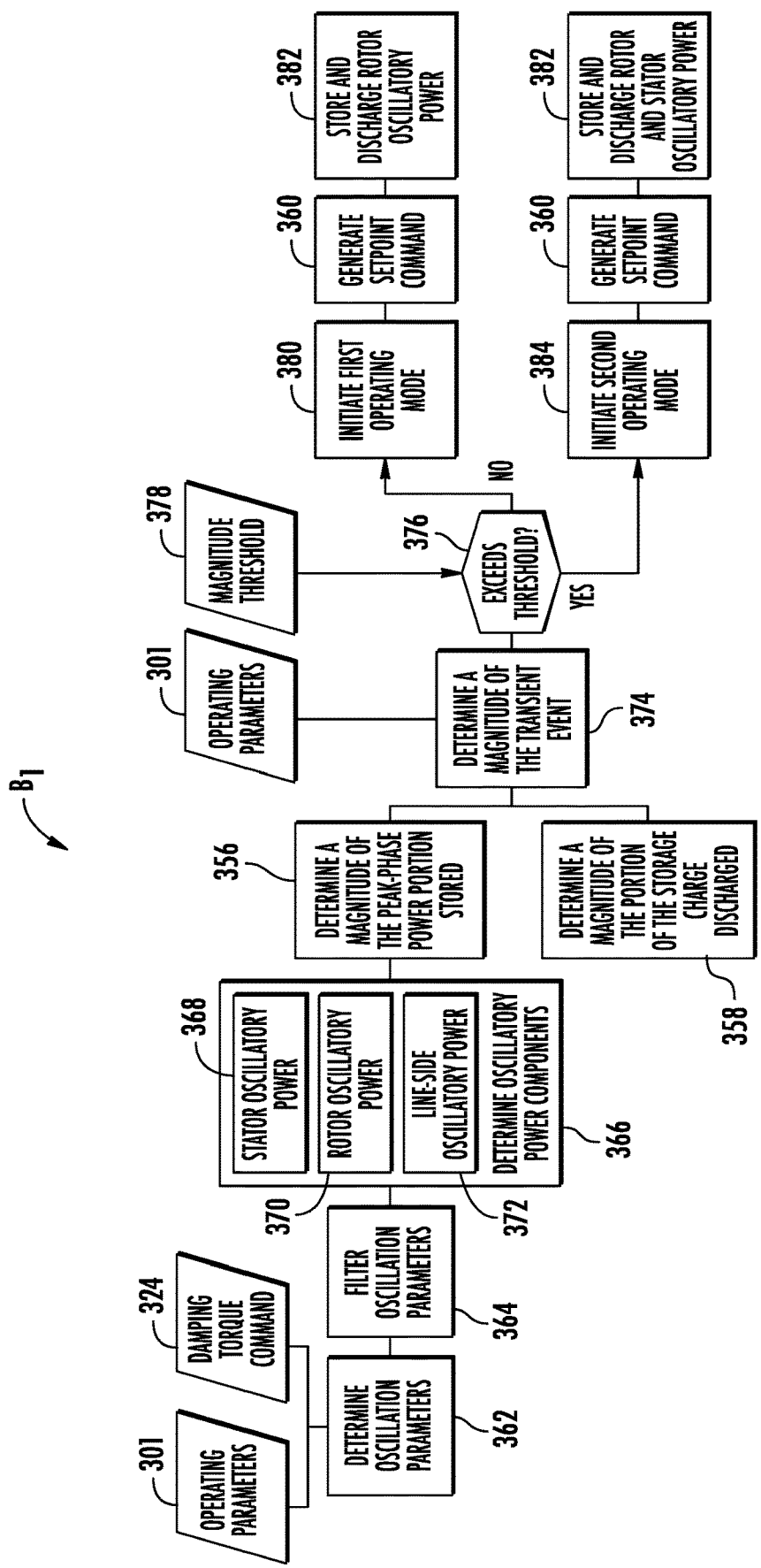
FIG. 7 illustrates a flow diagram of one embodiment of an expanded portion of the control logic of FIG. 6 according to the present disclosure.
Figure 8:
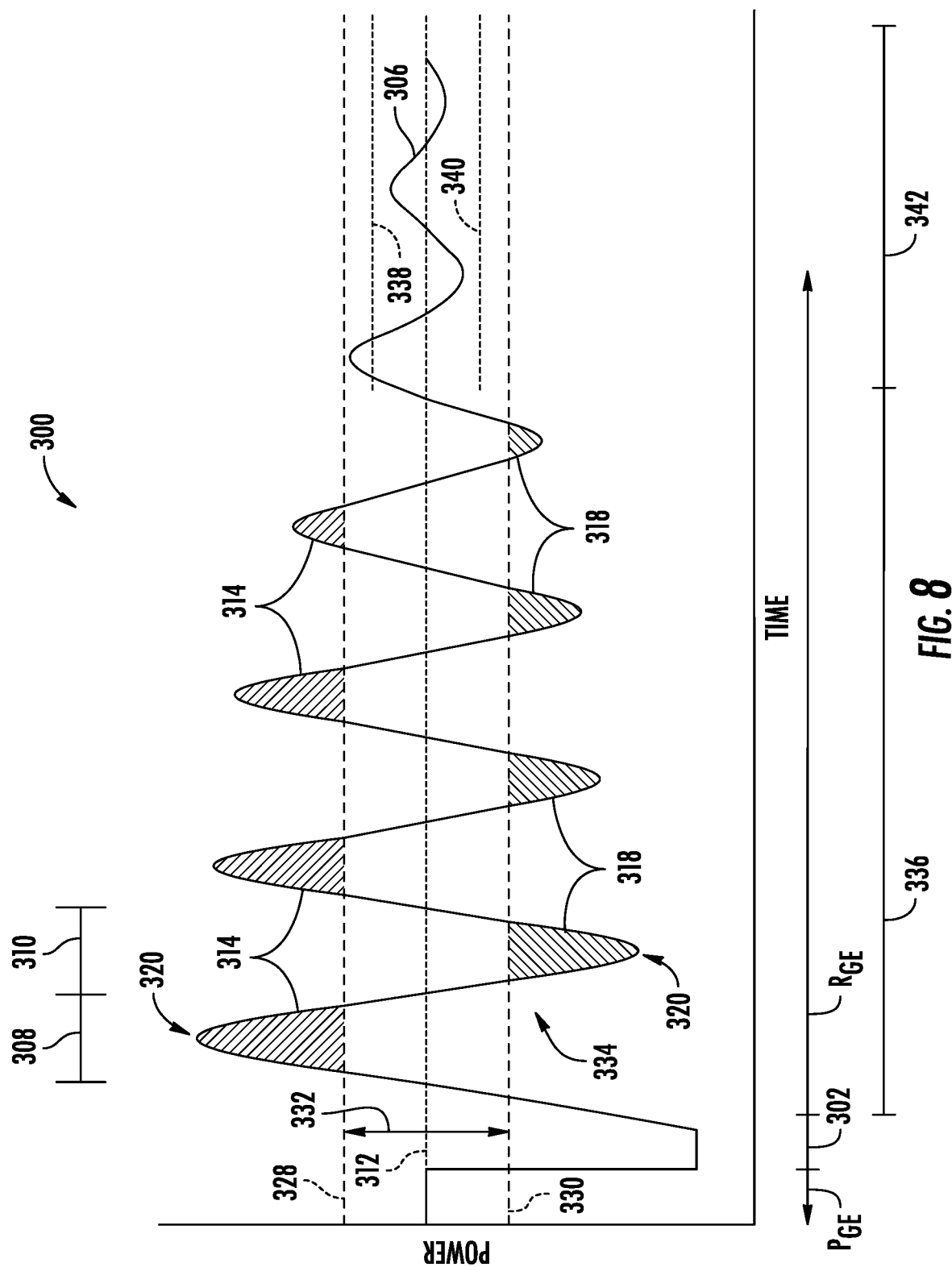
FIG. 8 illustrates a graphical representation of one embodiment of a power output of the wind turbine according to the present disclosure.

As illustrated in FIG. 7, additional aspects of the system 300 may be incorporated within block Bi as depicted by FIG. 6. As such, as depicted at 356, the system 300 may, in an embodiment, include determining, via an oscillation-compensation-control module 218 of the controller 200, a magnitude of the portion of the peak-phase power 314 stored by the energy storage device 436 in response to the detection of the oscillation 304. As depicted at 358, the oscillation-compensation-control module 218 may, in an embodiment, also determine a magnitude of the portion 318 of the storage charge 316 discharged upon the detection of the valley phase(s) 310. Based on the determined magnitudes of the storage charge 316 and discharge portion 318, the oscillation-compensation-control module 218 may generate a set-point command for the line-side converter 414 of the power converter 408 of the wind turbine 100 calculated to achieve the determined magnitudes.

In an embodiment, the oscillation-compensation-control module 218 may receive the plurality of operating parameters 301 from the operational sensor(s) 158 and the damping torque command 324 from the drive-train-damper control module 216. In an embodiment, the plurality of operating parameters 301 may be indicative of a magnitude of slip, a generator speed, and a plurality of voltages and currents. The plurality of voltages and currents may include a stator voltage and current, a rotor voltage and current, and a line-side voltage and current at each of three phases of power.

Based on one or more of the operating parameters 301 and the damping torque command 324, the oscillation-compensation-control module 218, may, in an embodiment, determine a plurality of oscillation parameters 362 for the power output 306. The plurality of oscillation parameters 362 may describe the characteristics of the oscillation 304. The plurality of oscillation parameters 362 for the power output 306 of the wind turbine 100 may be determined based on the magnitude of slip, the generator speed, and the damping torque command 324

As depicted at 364, the oscillation-compensation-control module 218 may, in an embodiment, filter the plurality of oscillation parameters 362 in order to obtain a plurality of oscillatory power components 366. The plurality of oscillatory components 366 may include a stator oscillatory power 368, a rotor oscillatory power 370, and a line-side oscillatory power 372. Accordingly, the oscillation-compensation-control module 218 may, in an embodiment, determine the magnitude of the portion of the peak-phase power 314 stored by the energy storage device 436 based, at least in part on at least one of the plurality of oscillatory power components 366.

As depicted at 374, in an embodiment, the oscillation-compensation-control module 218 may determine a magnitude of the transient event 302 based on the plurality of operating parameters 301. In an embodiment, the magnitude of the transient event 302 may be compared, at 376, to a magnitude threshold 378. In an embodiment wherein the magnitude of the transient event 302 does not exceed the magnitude threshold 378, the oscillation-compensation-control module 218 may initiate a first operating mode 380. As depicted at 382, the first operating mode 380 may include storing and discharging the rotor oscillatory power 370. In an embodiment wherein the magnitude of the transient event 302 exceeds the magnitude threshold 378, the oscillation-compensation-control module 218 may initiate a second operating mode 384. As depicted at 386, the second operating mode 384 may include storing and discharging both the rotor oscillatory power 370 and the stator oscillatory power 368. It should be appreciated that the employment of the first and second operating modes 380, 384 may facilitate the tailoring of the storage and discharge steps to the magnitude of the transient event 374 and, thus, to the resultant oscillations 304.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine connected to a power grid, the wind turbine including a generator, the method comprising: receiving, via a controller, an indication of a transient event occurring in the power grid; detecting, via the controller, an oscillation in a power output of the wind turbine during a transient-event recovery phase following the transient event, the oscillation comprising a peak phase followed by a valley phase relative to the power output prior to the transient event; in response to detecting the oscillation, storing at least a portion of a peak-phase power in an energy storage device operably coupled to the generator to establish a storage charge, wherein the peak-phase power corresponds to a power output during the peak phase; and discharging at least a portion of the storage charge to the power grid during the valley phase of the oscillation so as to reduce an amplitude of the oscillation of the power output delivered to the power grid.

Clause 2. The method of clause 1, wherein discharging at least the portion of the storage charge further comprises: determining, via the controller, a duration of the valley phase; and synchronizing a duration of the discharging of the portion of the storage charge to the duration of the valley phase.

Clause 3. The method of any preceding clause, further comprising: determining, via the controller, a ramp rate and an amplitude of the oscillation during the valley phase; and synchronizing the discharging of the portion of the storage charge to the ramp rate and the amplitude of the oscillation during the valley phase.

Clause 4. The method of any preceding clause, further comprising: determining an upper threshold and a lower threshold for a deviation of the power output of the wind turbine relative to the power output of the wind turbine prior to the transient event, the upper threshold and the lower threshold defining an oscillation tolerance band, and wherein the portion of the peak-phase power stored via the energy storage device is a portion of the peak-phase power exceeding the upper threshold; determining, via the controller, a portion of the valley-phase power which is below the lower threshold, wherein the portion of the storage charge discharged corresponds to the portion of the valley-phase power below the lower threshold, wherein the valley-phase power corresponds to a power output portion during the valley phase; and repeating the storing and discharging steps for subsequent oscillations until the deviation of the power output of the wind turbine remains within the oscillation tolerance band.

Clause 5. The method of any preceding clause, wherein the upper and lower thresholds are a first upper threshold and a first lower threshold applied at a first interval following the transient event, the method further comprising: determining a second upper threshold and a second lower threshold for the power output of the wind turbine relative to the power output prior to the transient event, wherein the second upper and second lower thresholds are applied at a second interval following the first interval and have a lower deviation from the power output prior to the transient event than the first upper and the first lower thresholds.

Clause 6. The method of any preceding clause, further comprising: discharging a residual portion of the storage charge at a residual discharge rate to the power grid when the deviation of the power output of the wind turbine remains within the oscillation tolerance band.

Clause 7. The method of any preceding clause, further comprising: determining, via an oscillation-compensation control module of the controller, a magnitude of the portion of the peak-phase power stored by the energy storage device in response to the detection of the oscillation; determining, via the oscillation-compensation control module, a magnitude of the portion of the storage charge discharged upon the detection of the valley phase; and generating, via the oscillation-compensation control module, a setpoint command for a line-side converter of a power converter of the wind turbine so as to achieve the determined storage charge and discharge.

Clause 8. The method of any preceding clause, further comprising: receiving, via the oscillation-compensation control module, a plurality of operating parameters; receiving, via the oscillation-compensation control module, a damping torque command from a drive train damping system of the wind turbine; determining, via the oscillation-compensation control module, a plurality of oscillation parameters for the power output of the wind turbine based on one or more of the operating parameters and the damping torque command; filtering, via the oscillation-compensation control module, the plurality of oscillation parameters to obtain a plurality of oscillatory power components, the plurality of oscillatory power components comprising at least one of a stator oscillatory power, a rotor oscillatory power, and a line-side oscillatory power; and determining, via the oscillation-compensation control module, a magnitude of the portion of the peak-phase power stored by the energy storage device based, at least in part, on at least one of the plurality of oscillatory power components.

Clause 9. The method of claim 8, further comprising: determining, via the oscillation-compensation control module, a magnitude of the transient event based on the plurality of operating parameters; and initiating, via the oscillation-compensation control module, one of a first or a second operating mode based on the magnitude of the transient event, wherein the first operating mode comprises storing and discharging the rotor oscillatory power, and wherein the second operating mode comprises storing and discharging both the rotor oscillatory power and the stator oscillatory power.

Clause 10. The method of any preceding clause, wherein the plurality of operating parameters are indicative of a magnitude of slip, a generator speed, and a plurality of voltages and currents, the plurality of voltages and currents comprising a stator voltage and current, a rotor voltage and current, and a line-side voltage and current at each of three phases of power, and wherein determining the plurality of oscillation parameters for the power output of the wind turbine is based on the magnitude of slip, the generator speed, and the damping torque command.

Clause 11. The method of any preceding clause wherein the energy storage device comprises at least one of a battery and a super capacitor.

Clause 12. The method of any preceding clause, wherein receiving the indication of the transient event occurring in the power grid further comprises: receiving, via the controller, data indicative of the transient event from a sensor operably coupled between a line side of a power converter of the wind turbine and a point of interconnect with the power grid.

Clause 13. The method of any preceding clause, wherein the transient event comprises one of a zero-voltage ride through event, a low-voltage ride through event, and a high-voltage ride through event.

Clause 14. The method of any preceding clause, wherein receiving the indication of the transient event further comprises: detecting, via the controller, a change in a drivetrain torque of the wind turbine indicative of the transient event.

Clause 15. A system for controlling a wind turbine connected to a power grid, the system comprising: a generator operably coupled to an energy storage device; and a controller communicatively coupled to the generator, the controller comprising at least one processor configured to perform a plurality of operations, the plurality of operations comprising: receiving an indication of a transient event occurring in the power grid, detecting an oscillation in a power output of the wind turbine during a transient-event recovery phase following the transient event, the oscillation comprising a peak phase followed by a valley phase relative to the power output prior to the transient event, in response to detecting the oscillation, storing at least a portion of the power output during the peak phase in an energy storage device operably coupled to the generator to establish a storage charge, and discharging at least a portion of the storage charge to the power grid during the valley phase of the oscillation so as to reduce an amplitude of the oscillation of the power output delivered to the power grid.

Clause 16. The system of any preceding clause, wherein discharging at least the portion of the storage charge further comprises: determining a duration of the valley phase; and synchronizing a duration of the discharging of the portion of the storage charge to the duration of the valley phase.

Clause 17. The system of any preceding clause, wherein the plurality of operations further comprise: determining an upper threshold and an lower threshold for a deviation of the power output of the wind turbine relative to the power output of the wind turbine prior to the transient event, the upper threshold and the lower threshold defining an oscillation tolerance band, wherein the portion of the peak-phase power stored via the energy storage device is a portion of the peak-phase power exceeding the upper threshold; determining a portion of the valley-phase power below the lower threshold, wherein the portion of the storage charge discharged corresponds to the portion of the valley-phase power below the lower threshold; and repeating the storing and discharging steps for subsequent oscillations until the deviation of the power output of the wind turbine remains within the oscillation tolerance band.

Clause 18. The system of any preceding clause, wherein the plurality of operations further comprise: determining a magnitude of the portion of the peak-phase power stored by the energy storage device; determining an amount of the storage charge discharged upon the detection of the valley phase; and generating a setpoint command for a line-side converter of a power converter of the wind turbine so as to achieve the determined storage charge and discharge.

Clause 19. The system of any preceding clause, wherein the plurality of operations further comprise: receiving a plurality of operating parameters indicative of a magnitude of slip, a generator speed, and a plurality of voltages and currents, the plurality of voltages and currents comprising a stator voltage and current, a rotor voltage and current, and a line-side voltage and current at each of three phases of power; receiving a damping torque command from a drive train damping system of the wind turbine; determining a plurality of oscillation parameters for the power output of the wind turbine based on the magnitude of slip, the generator speed, and the damping torque command; filtering, via the oscillation-compensation control module, the plurality of oscillation parameters to obtain a plurality of oscillatory power components, the plurality of oscillatory power components comprising at least one of a stator oscillatory power, a rotor oscillatory power, and a line-side oscillatory power; and determining, via the oscillation-compensation control module, a magnitude of the portion of the peak-phase power stored by the energy storage device based, at least in part, on at least one of the plurality of oscillatory power components.

Clause 20. The system of any preceding clause, wherein the plurality of operations further comprise: determining, via the control module, a magnitude of the transient event based on the plurality of operating parameters; and initiating, via the control module, one of a first or a second operating mode based on the magnitude of the transient event, wherein the first operating mode comprises storing and discharging the rotor oscillatory power, and wherein the second operating mode comprises storing and discharging both the rotor oscillatory power and the stator oscillatory power.

What is claimed is:

1. A method for controlling a wind turbine connected to a power grid, the wind turbine including a generator, the method comprising:
receiving, via a controller, an indication of a transient event occurring in the power grid;
detecting, via the controller, an oscillation in a power output of the wind turbine during a transient event recovery phase following the transient event, the oscillation comprising a peak phase followed by a valley phase;
in response to detecting the oscillation, storing at least a portion of a peak phase power in an energy storage device operably coupled to the generator to establish a storage charge, wherein the peak phase power corresponds to a power output during the peak phase;
discharging at least a portion of the storage charge to the power grid during the valley phase of the oscillation so as to reduce an amplitude of the oscillation of the power output delivered to the power grid;
determining an upper threshold and a lower threshold for a deviation of the power output of the wind turbine relative to the power output of the wind turbine prior to the transient event, the upper threshold and the lower threshold defining an oscillation tolerance band, wherein the portion of the peak phase power stored via the energy storage device is a portion of the peak phase power exceeding the upper threshold;
determining, via the controller, a portion of a valley phase power that is below the lower threshold, wherein the portion of the storage charge discharged corresponds to the portion of the valley phase power below the lower threshold, wherein the valley phase power corresponds to a power output portion during the valley phase; and
repeating the storing and discharging steps for subsequent oscillations until the deviation of the power output of the wind turbine remains within the oscillation tolerance band.

2. The method of claim 1, wherein discharging at least the portion of the storage charge further comprises:
determining, via the controller, a duration of the valley phase; and
synchronizing a duration of the discharging of the portion of the storage charge to the duration of the valley phase.

3. The method of claim 2, further comprising:
determining, via the controller, a ramp rate and an amplitude of the oscillation during the valley phase; and
synchronizing the discharging of the portion of the storage charge to the ramp rate and the amplitude of the oscillation during the valley phase.

4. The method of claim 1, wherein the upper and lower thresholds are a first upper threshold and a first lower threshold applied at a first interval following the transient event, the method further comprising:
determining a second upper threshold and a second lower threshold for the power output of the wind turbine relative to the power output prior to the transient event, wherein the second upper and second lower thresholds are applied at a second interval following the first interval and have a lower deviation from the power output prior to the transient event than the first upper and the first lower thresholds.

5. The method of claim 1, further comprising:
discharging a residual portion of the storage charge at a residual discharge rate to the power grid when the deviation of the power output of the wind turbine remains within the oscillation tolerance band.

6. The method of claim 1, further comprising:
determining, via an oscillation compensation control module of the controller, a magnitude of the portion of the peak phase power stored by the energy storage device in response to the detection of the oscillation;
determining, via the oscillation compensation control module, a magnitude of the portion of the storage charge discharged upon the detection of the valley phase; and
generating, via the oscillation compensation control module, a setpoint command for a line side converter of a power converter of the wind turbine so as to achieve the determined storage charge and discharge.

7. The method of claim 6, further comprising:
receiving, via the oscillation compensation control module, a plurality of operating parameters;
receiving, via the oscillation compensation control module, a damping torque command from a drive train damping system of the wind turbine;
determining, via the oscillation compensation control module, a plurality of oscillation parameters for the power output of the wind turbine based on one or more of the operating parameters and the damping torque command;
filtering, via the oscillation compensation control module, the plurality of oscillation parameters to obtain a plurality of oscillatory power components, the plurality of oscillatory power components comprising at least one of a stator oscillatory power, a rotor oscillatory power, and a line side oscillatory power; and
determining, via the oscillation compensation control module, a magnitude of the portion of the peak phase power stored by the energy storage device based, at least in part, on at least one of the plurality of oscillatory power components.

8. The method of claim 7, further comprising:
determining, via the oscillation compensation control module, a magnitude of the transient event based on the plurality of operating parameters; and
initiating, via the oscillation compensation control module, one of a first or a second operating mode based on the magnitude of the transient event, wherein the first operating mode comprises storing and discharging the rotor oscillatory power, and wherein the second operating mode comprises storing and discharging both the rotor oscillatory power and the stator oscillatory power.

9. The method of claim 7, wherein the plurality of operating parameters are indicative of a magnitude of slip, a generator speed, and a plurality of voltages and currents, the plurality of voltages and currents comprising a stator voltage and current, a rotor voltage and current, and a line side voltage and current at each of three phases of power, and wherein determining the plurality of oscillation parameters for the power output of the wind turbine is based on the magnitude of slip, the generator speed, and the damping torque command.

10. The method of claim 1, wherein the energy storage device comprises at least one of a battery and a super capacitor.

11. The method of claim 1, wherein receiving the indication of the transient event occurring in the power grid further comprises:
receiving, via the controller, data indicative of the transient event from a sensor operably coupled between a line side of a power converter of the wind turbine and a point of interconnect with the power grid.

12. The method of claim 11, wherein the transient event comprises one of a zero voltage ride through event, a low voltage ride through event, and a high voltage ride through event.

13. The method of claim 1, wherein receiving the indication of the transient event further comprises:
detecting, via the controller, a change in a drivetrain torque of the wind turbine indicative of the transient event.

14. A system for controlling a wind turbine connected to a power grid, the system comprising:
a generator operably coupled to an energy storage device; and
a controller communicatively coupled to the generator, the controller comprising at least one processor configured to perform a plurality of operations, the plurality of operations comprising:
receiving an indication of a transient event occurring in the power grid,
detecting an oscillation in a power output of the wind turbine during a transient event recovery phase following the transient event, the oscillation comprising a peak phase followed by a valley phase,
in response to detecting the oscillation, storing at least a portion of a peak phase power in an energy storage device operably coupled to the generator to establish a storage charge, wherein the peak phase power corresponds to a power output during the peak phase, and
discharging at least a portion of the storage charge to the power grid during the valley phase of the oscillation so as to reduce an amplitude of the oscillation of the power output delivered to the power grid;
determining an upper threshold and an lower threshold for a deviation of the power output of the wind turbine relative to the power output of the wind turbine prior to the transient event, the upper threshold and the lower threshold defining an oscillation tolerance band, wherein the portion of the peak phase power stored via the energy storage device is a portion of the peak phase power exceeding the upper threshold;
determining a portion of a valley phase power below the lower threshold, wherein the portion of the storage charge discharged corresponds to the portion of the valley phase power below the lower threshold, wherein the valley phase power corresponds to a power output portion during the valley phase; and
repeating the storing and discharging steps for subsequent oscillations until the deviation of the power output of the wind turbine remains within the oscillation tolerance band.

15. The system of claim 14, wherein discharging at least the portion of the storage charge further comprises:
determining a duration of the valley phase; and
synchronizing a duration of the discharging of the portion of the storage charge to the duration of the valley phase.

16. The system of claim 14, wherein the plurality of operations further comprise:
determining a magnitude of the portion of the peak phase power stored by the energy storage device;
determining an amount of the storage charge discharged upon the detection of the valley phase; and
generating a setpoint command for a line side converter of a power converter of the wind turbine so as to achieve the determined storage charge and discharge.

17. The system of claim 16, wherein the plurality of operations further comprise:
receiving a plurality of operating parameters indicative of a magnitude of slip, a generator speed, and a plurality of voltages and currents, the plurality of voltages and currents comprising a stator voltage and current, a rotor voltage and current, and a line side voltage and current at each of three phases of power;
receiving a damping torque command from a drive train damping system of the wind turbine;
determining a plurality of oscillation parameters for the power output of the wind turbine based on the magnitude of slip, the generator speed, and the damping torque command;
filtering, via an oscillation compensation control module, the plurality of oscillation parameters to obtain a plurality of oscillatory power components, the plurality of oscillatory power components comprising at least one of a stator oscillatory power, a rotor oscillatory power, and a line side oscillatory power; and
determining, via the oscillation compensation control module, a magnitude of the portion of the peak phase power stored by the energy storage device based, at least in part, on at least one of the plurality of oscillatory power components.

18. The system of claim 17, wherein the plurality of operations further comprise:
determining, via the oscillation compensation control module, a magnitude of the transient event based on the plurality of operating parameters; and
initiating, via the oscillation compensation control module, one of a first or a second operating mode based on the magnitude of the transient event, wherein the first operating mode comprises storing and discharging the rotor oscillatory power, and wherein the second operating mode comprises storing and discharging both the rotor oscillatory power and the stator oscillatory power.

* * * * *